(12) United States Patent
Hirano (10) Patent No.: US 9,341,210 B2
(45) Date of Patent: May 17, 2016

(54) FASTENER

(75) Inventor: Yoichi Hirano, Hiroshima (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/344,717

(22) PCT Filed: Sep. 12, 2012

(86) PCT No.: PCT/JP2012/073357
§ 371 (c)(1),
(2), (4) Date: Apr. 7, 2014

(87) PCT Pub. No.: WO2013/039115
PCT Pub. Date: Mar. 21, 2013

(65) Prior Publication Data
US 2014/0341674 A1    Nov. 20, 2014

(30) Foreign Application Priority Data

Sep. 16, 2011 (JP) .................................. 2011-203340

(51) Int. Cl.
F16B 19/10 (2006.01)
(52) U.S. Cl.
CPC .............. *F16B 19/10* (2013.01); *F16B 19/1081* (2013.01)
(58) Field of Classification Search
CPC ............................. F16B 19/10; F16B 19/1081
USPC .................. 411/24, 33, 44, 45, 56, 57.1, 80.5
See application file for complete search history.

(56) References Cited

U.S. PATENT DOCUMENTS

| 4,874,276 | A | 10/1989 | Iguchi |
| 5,211,519 | A * | 5/1993 | Saito ............................... 411/45 |
| 2008/0031701 | A1 | 2/2008 | Boubtane et al. |
| 2011/0170982 | A1* | 7/2011 | Watanabe ..................... 411/360 |
| 2013/0287517 | A1* | 10/2013 | Fujiwara ..................... 411/54.1 |

FOREIGN PATENT DOCUMENTS

| JP | H11-270525 A | 10/1999 |
| JP | 2007-056895 A | 3/2007 |
| JP | 4679871 B2 | 5/2011 |

(Continued)

OTHER PUBLICATIONS

PCT Form PCT/ISA/210, International Search Report for PCT/JP2012/073357.

(Continued)

*Primary Examiner* — Gay Spahn
(74) *Attorney, Agent, or Firm* — Manabu Kanesaka (57) ABSTRACT

In a fastener (10), a pin (14) is pressed into a grommet (12), so that a guide portion (56) formed in an end side of the pin (14) contacts with a guided portion (42) of the grommet (12), and a leg piece (34) of a leg portion (28) of the grommet bends and is expanded. Then, the guided portion (42) of the leg piece (34) in the leg portion (28) of the grommet (12) is engaged with an upper end edge (56A) of the guide portion (56) of the pin (14). Also, the guide portion (56) of the pin (14) is a curved surface having a tangent angle (θ) changing relative to a shaft line (14B) at a contact point (P1) with the guided portion (42) from an outer circumferential portion of an end (14A) of the pin (14) toward an upper end edge (56A), and an insertion force (S) into the grommet (12) of the pin (14) at each contact point (P1) is held approximately constant.

3 Claims, 7 Drawing Sheets

(56) References Cited

FOREIGN PATENT DOCUMENTS

| JP | 2011-179634 A | 9/2011 | | |
|----|---------------|--------|---|---|
| RU | 2007107185 A | 9/2008 | | |
| WO | WO 2012/086652 A1 * | 6/2012 | .............. | F16B 19/10 |

OTHER PUBLICATIONS

Europe Patent Office, "Search Report for EP 12832135.3," Jun. 1, 2015.
Russia Patent Office, "Decision on Grant for RU 2014113431," Jun. 29, 2015.

* cited by examiner

FASTENER

RELATED APPLICATIONS

The present application is National Phase of International Application No. PCT/JP2012/073357 filed Sep. 12, 2012, and claims priority from Japanese Application No. 2011-203340, filed Sep. 16, 2011.

FIELD OF TECHNOLOGY

The present invention relates to a fastener which can fasten a fastened member to a fastening member by inserting a second member to a first member.

BACKGROUND ART

Conventionally, as for a fastener fastening the fastened member to the fastening member, there is, for example, Patent Document 1. In the conventional technology, a guide portion of a pin is inclined relative to a shaft line of the pin in two steps, and a partition on an end side of the guide portion becomes a first guide portion including a guide face inclined at 30 to 65 degrees to the shaft line of the pin, and a partition on a base end side of the guide portion becomes a second guide portion including a guide face inclined at 5 to 25 degrees to the shaft line of the pin. Then, in a first half of an insertion wherein the pin is pressed into a grommet, a guided portion is guided by the guide face of the first guide portion so as to expand a leg portion. Also, in a second half of the insertion, the guided portion is guided by the guide face of the second guide portion so as to expand the leg portion.

PRIOR ART DOCUMENT

Patent Document

Patent Document 1: Japanese Patent No. 4679871

SUMMARY OF THE INVENTION

Problems to be Solved by the Invention

The present invention provides a fastener in which a second member is smoothly inserted into a first member without rapidly changing an insertion force into the first member of the second member, and which can control an increase of the insertion force in the second half of the insertion into the first member of the second member so as to improve operability at an insertion time.

Means for Solving the Problems

The first aspect of the present invention is to provide a fastener comprising a first member including a flange portion, and a leg portion extending from the flange portion, forming an insertion hole opening at the flange portion, divided around a shaft line, and formed with a guided portion in an inner circumferential portion of the insertion hole; and a second member forming a guide portion from a vicinity of an end toward a base direction, and pressed into the insertion hole of the first member so as to contact the guide portion with the guided portion and to expand the leg portion. Also, the guide portion is a curved surface changing a tangent angle relative to a shaft line at a contact point with the guided portion from an end side toward a base portion side, and an insertion force into the first member at each contact point is held approximately constant.

In the aforementioned aspect, when the second member is pressed into the insertion hole of the first member, the guide portion of the second member contacts with the guided portion of the first member so as to expand the leg portion of the first member. At that time, the guide portion is the curved surface changing the tangent angle relative to the shaft line at the contact point with the guided portion from the end side toward the base portion side, and the insertion force into the first member of the second member at each contact point becomes approximately constant. Consequently, the second member is smoothly inserted into the first member without rapidly changing the insertion force into the first member from the second member, and an increase of the insertion force in a second half of an insertion into the first member from the second member is controlled so as to improve operability at an insertion time.

As for a second aspect of the present invention, in the first aspect of the present invention, when Young's modulus of the leg portion is presumed to be constant, and a frictional force at the contact point is presumed to be 0, and an opening volume or amount of the leg portion at an arbitrary point on the curved surface is V, and the tangent angle is $\theta$, a relationship of $V \sin \theta = \text{constant}$ may be established at the arbitrary point on the curved surface.

In the aforementioned aspect, when the Young's modulus of the leg portion is presumed to be constant, and the frictional force at the contact point is presumed to be 0, and the opening volume of the leg portion at the arbitrary point on the curved surface of the guide portion is V, and the tangent angle is $\theta$, the relationship of $V \sin \theta = \text{constant}$ is established at the arbitrary point on the curved surface. Consequently, in view of a length of the guide portion, the curved surface of the guide portion is formed so as to become $V \sin \theta = \text{constant}$, so that the second member is smoothly inserted into the first member without rapidly changing the insertion force into the first member from the second member, and the increase of the insertion force in the second half of the insertion into the first member from the second member is controlled so as to improve the operability at the insertion time.

Effect of the Invention

The first aspect of the present invention has the aforementioned structure, so that the second member is smoothly inserted into the first member without rapidly changing the insertion force into the first member from the second member, and the increase of the insertion force in the second half of the insertion into the first member from the second member is controlled so as to improve the operability at the insertion time.

The second aspect of the present invention has the aforementioned structure, so that the second member is smoothly inserted into the first member without rapidly changing the insertion force into the first member from the second member, and the increase of the insertion force in the second half of the insertion into the first member from the second member is controlled so as to improve the operability at the insertion time.

BEST MODES OF CARRYING OUT THE INVENTION

Next, one embodiment of a fastener of the present invention will be explained according to FIG. 1 to FIG. 9.

Incidentally, in figures, the same symbols are assigned to members (structure elements) having the same or corresponding functions, and their explanations are arbitrarily omitted.

Figure 3:
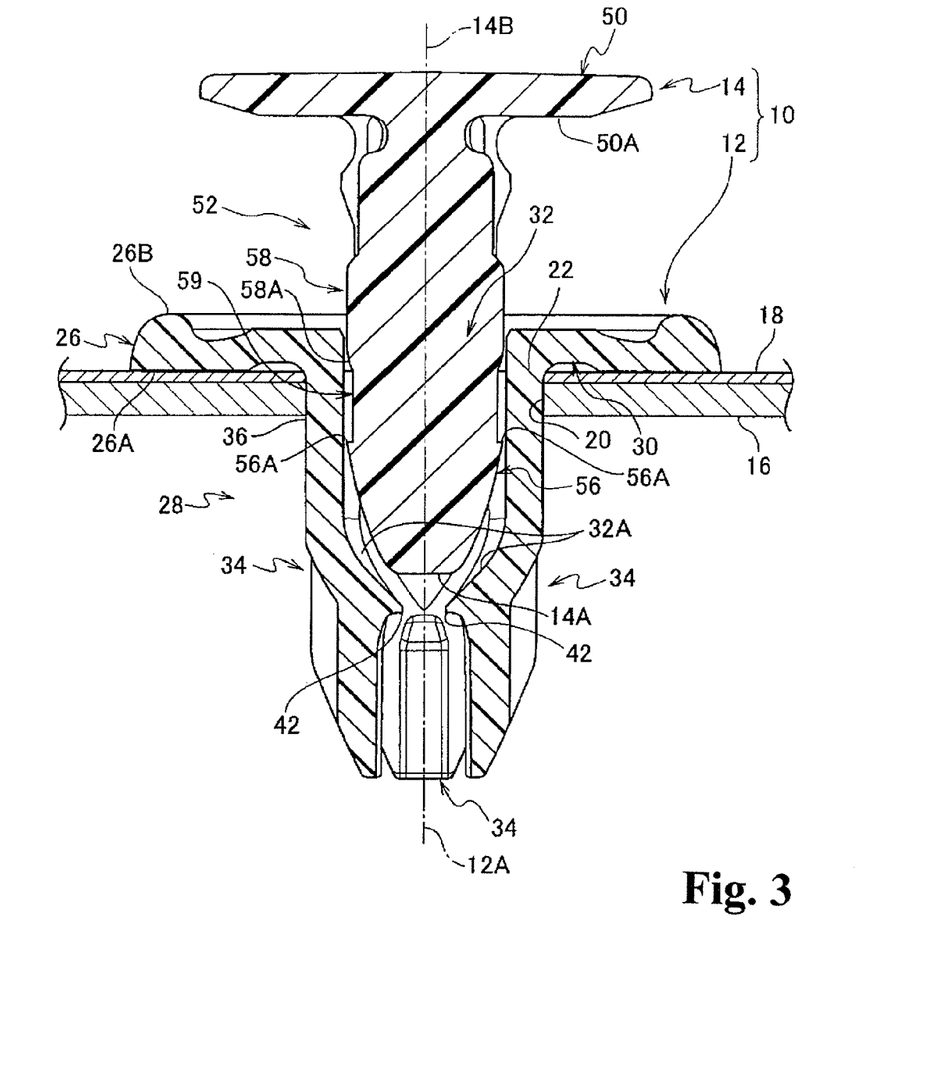
FIG. 3 is a side cross-sectional view showing a state wherein the fastener is inserted into attachment holes of a fastening member and a fastened member according to one embodiment of the present invention.
Figure 4:
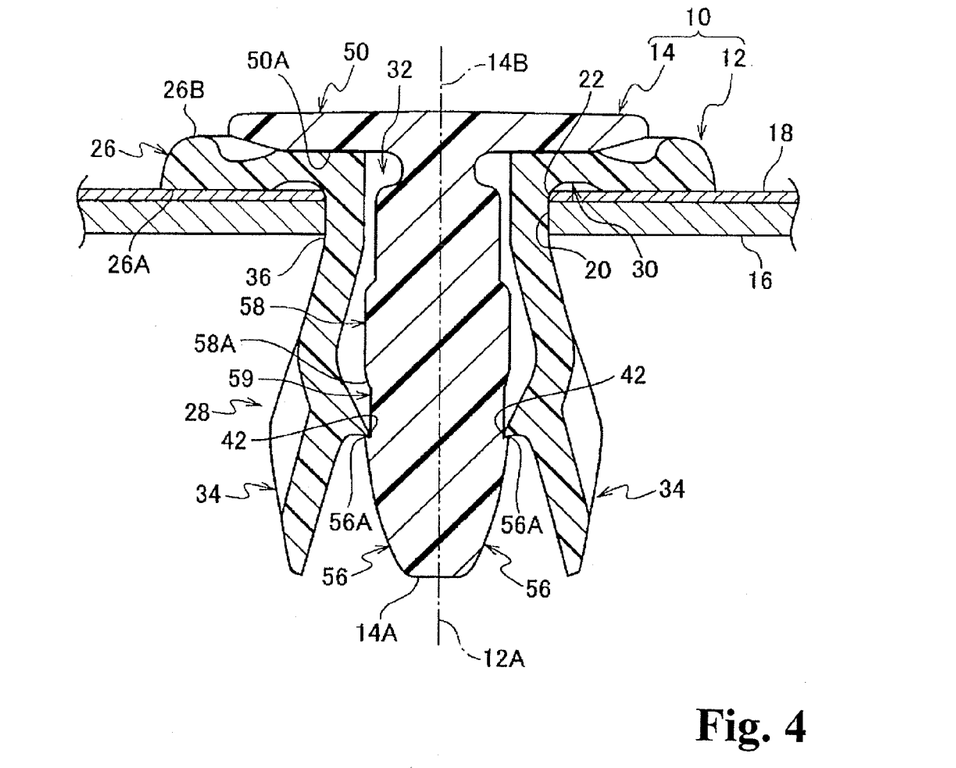
FIG. 4 is a side cross-sectional view showing a state wherein the fastening member and the fastened member are fastened by the fastener according to one embodiment of the present invention.

As shown in FIG. 3 and FIG. 4, a fastener 10 of the present embodiment comprises a grommet 12 (a first member) as the first member, and a pin 14 (a second member) as the second member so as to become a so-called push-and-rivet-type two-piece clip. Then, by the fastener 10, for example, a fastened member 18 such as an interior part and the like can be fastened to a fastening member 16 such as a panel part of an automobile and the like.

Grommet of Fastener

Figure 5:
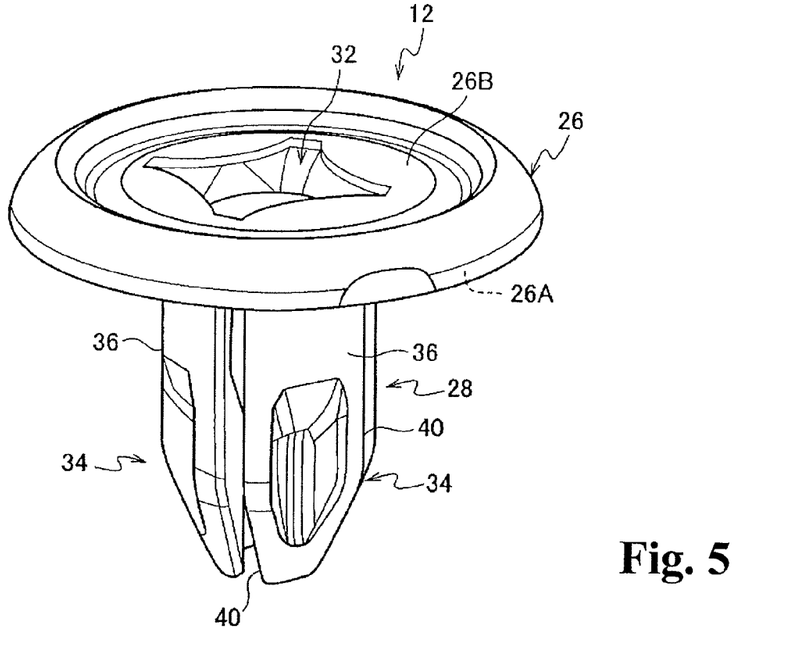
FIG. 5 is a perspective view showing a grommet of the fastener according to one embodiment of the present invention.

As shown in FIG. 5, in the grommet 12, there is formed a flange portion 26 having approximately a circular disc shape in one end portion in a shaft direction. An outer diameter of the flange portion 26 is larger than each hole diameter of an attachment hole 20 formed in the fastening member 16, and an attachment hole 22 formed in the fastened member 18 (see FIG. 3). Also, in a lower face 26A of the flange portion 26, there is formed a leg portion 28 extending downward (a downward direction in FIG. 5). Inside the leg portion 28 of the grommet 12, there is formed a pin insertion hole 32 (an insertion hole) as the insertion hole opened at an upper face 26B of the flange portion 26. Moreover, the leg portion 28 is provided with four leg pieces 34.

Figure 6:
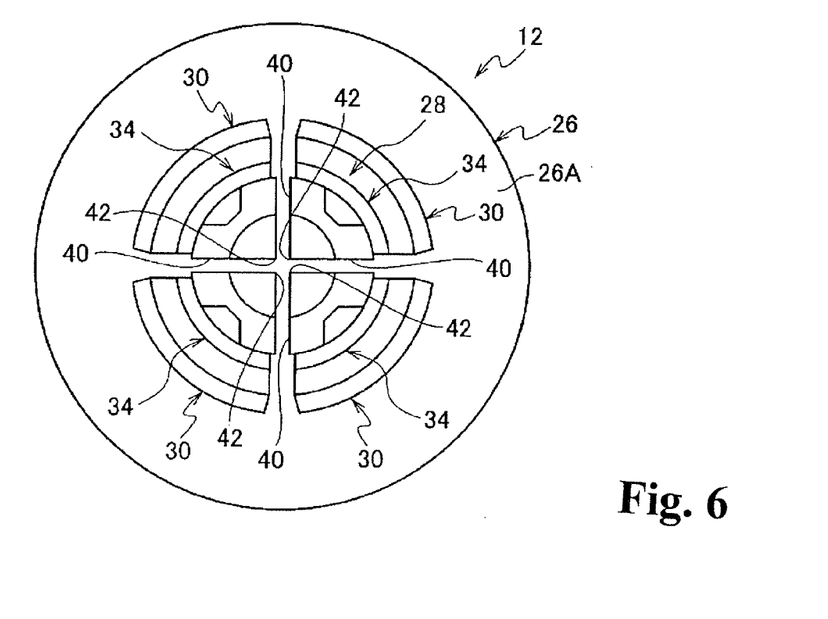
FIG. 6 is a front view showing the grommet of the fastener viewed from an end side in a shaft direction according to one embodiment of the present invention.

As shown in FIG. 6, each leg piece 34 of the leg portion 28 of the grommet 12 is divided around a shaft line by two shaft flat surfaces of the grommet 12 which are mutually orthogonal. Also, slits 40 having a predetermined width are formed between the respective leg pieces 34 next to each other, and in the lower face 26A of the flange portion 26, there are formed grooves 30 along an outer circumferential portion of the respective leg pieces 34.

As shown in FIG. 4, a vicinity of a base portion of each leg piece 34 of the grommet 12 becomes a hinge portion 36 when each leg piece 34 opens.

As shown in FIG. 3, the pin insertion hole 32 extends inside the leg portion 28 of the grommet 12, and there is formed a bottom portion 32A of the pin insertion hole 32 having approximately a bowl shape. Also, at positions having equal distances from the lower face 26A of the flange portion 26 inside the respective leg pieces 34 in the grommet 12, there are formed guided portions 42 to protrude toward a shaft line 12A of the grommet 12.

Pin of Fastener

Figure 7:
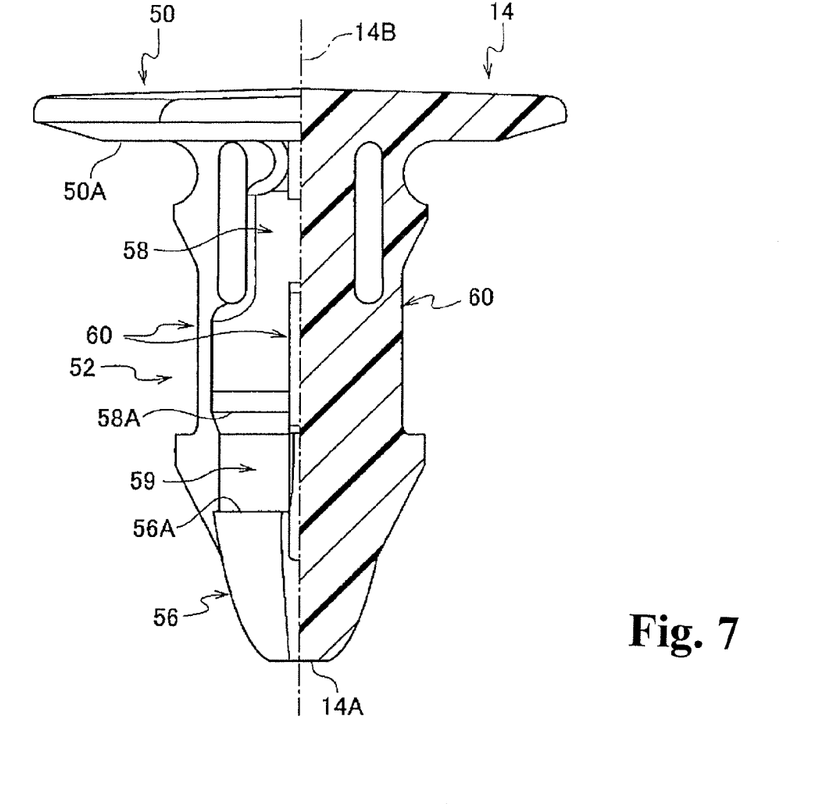
FIG. 7 is a side view showing a pin of the fastener whose half is in a cross section according to one embodiment of the present invention.

As shown in FIG. 7, in one end in a shaft direction of the pin 14, there is formed a head portion 50 having approximately a circular disc shape. An outer diameter of the head portion 50 of the pin 14 is larger than an inner diameter of the pin insertion hole 32 opened at the flange portion 26 of the grommet 12 (see FIG. 5). Also, in a lower face 50A of the head portion 50, there is formed a shaft portion 52 extending downward (a downward direction in FIG. 7).

In an end side (a lower side in FIG. 7) of the shaft portion 52 in the pin 14, there is formed a guide portion 56. Also, on a base portion side of the shaft portion 52, there is formed a base portion 58 extending from the lower face 50A of the head portion 50. The guide portion 56 and the base portion 58 are provided in the same straight line through an intermediate portion 59 formed approximately in a column shape. An outer diameter of the intermediate portion 59 is smaller than outer diameters of both a lower end edge 58A of the base portion 58 and an upper end edge 56A of the guide portion 56. Then, the upper end edge 56A of the guide portion 56 is formed along a circumferential direction of the pin 14.

Incidentally, as shown in FIG. 4, when the pin 14 is completely inserted into the grommet 12, and a pull-in force is sufficiently enhanced, the guided portion 42 of the leg piece 34 of the grommet 12 is engaged with the upper end edge 56A of the guide portion 56 of the pin 14.

Figure 1:
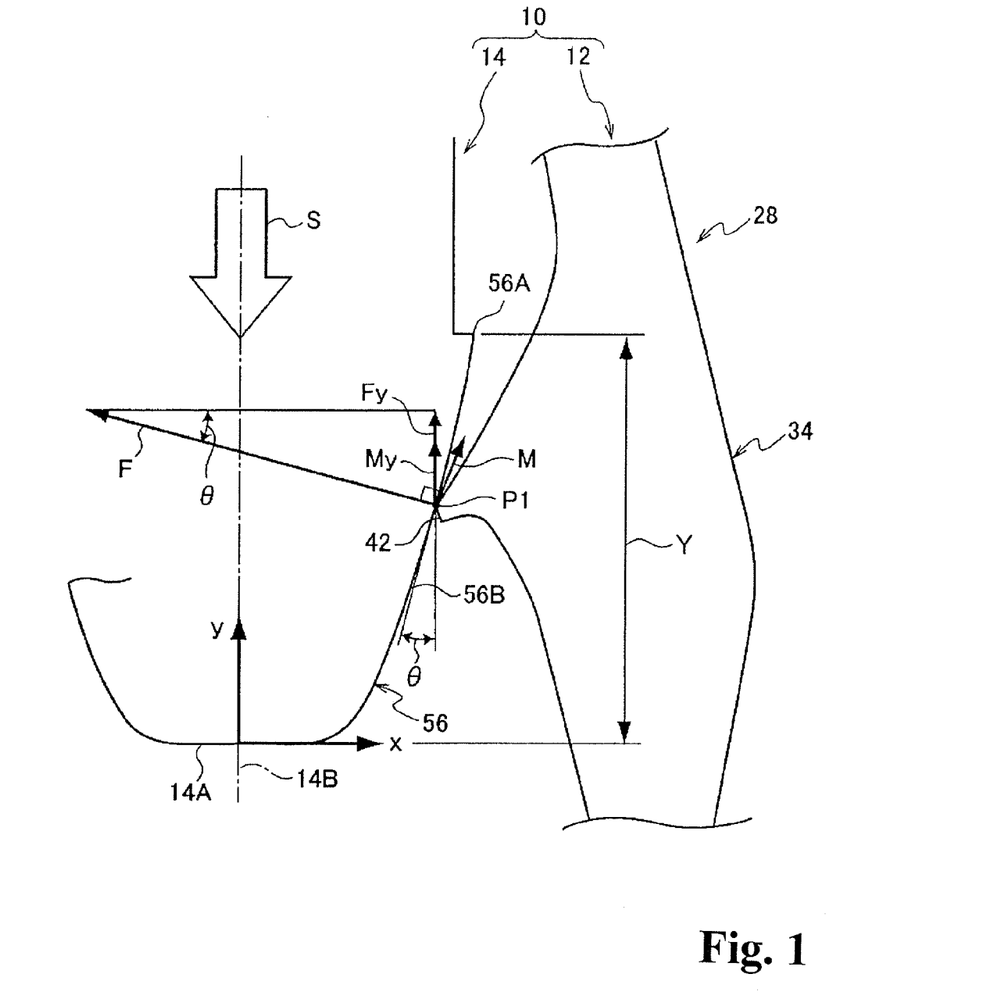
FIG. 1 is an enlarged explanatory view showing essential parts of a fastener according to one embodiment of the present invention.

As shown in FIG. 1, an end portion of the pin 14 is formed in a circular truncated cone shape, and an end 14A has a flat surface orthogonal to a shaft line 14B of the pin 14. Also, the guide portion 56 of the pin 14 has a curved surface having a tangent angle (inclination angle) θ changing relative to the shaft line 14B at a contact point P1 with the guided portion 42 from an outer circumferential edge of the end 14A of the pin 14 toward the upper end edge 56A. Thereby, when Young's modulus of the leg piece 34 of the leg portion 28 of the grommet 12 is presumed to be constant, and a frictional force between the grommet 12 and the pin 14 at the contact point P1 is presumed to be 0, an insertion force S is held approximately constant.

Figure 2:
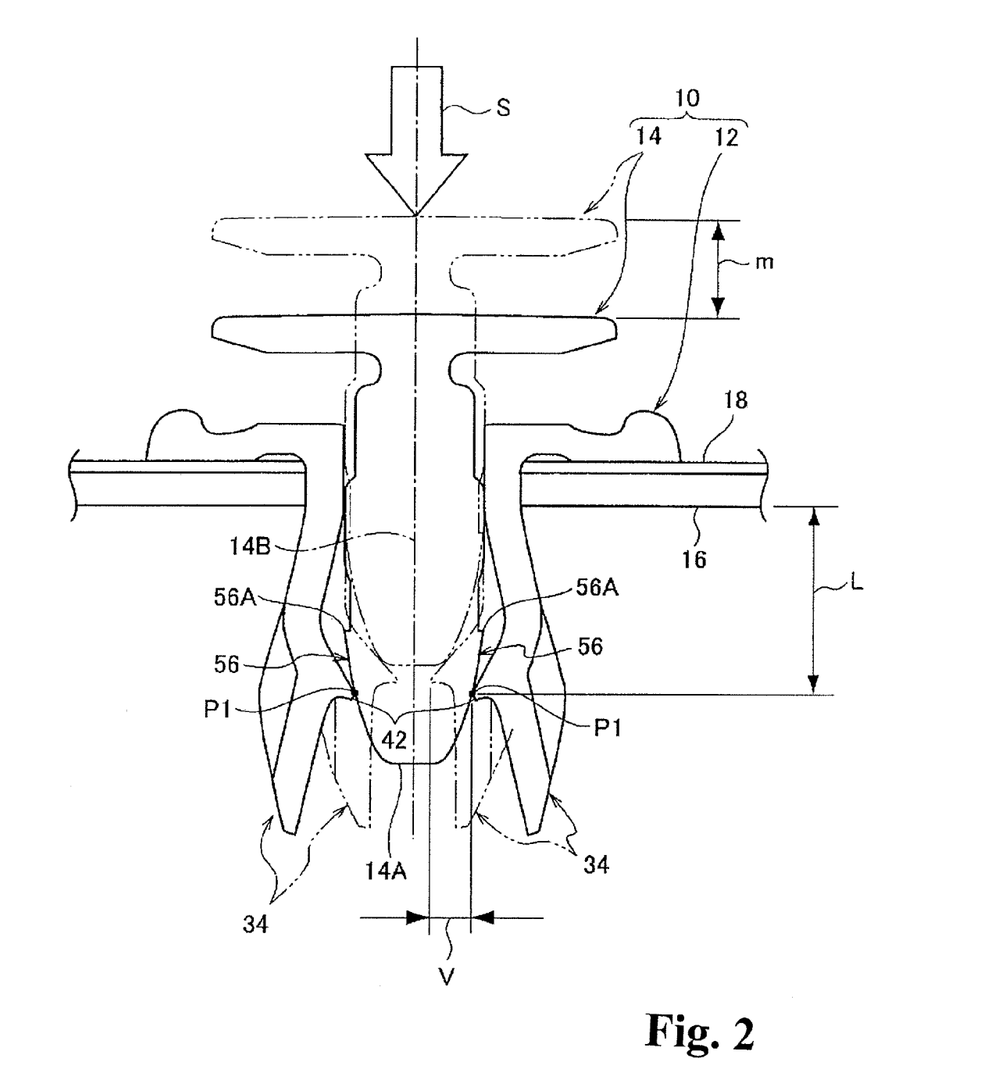
FIG. 2 is an explanatory view showing the fastener according to one embodiment of the present invention.

More specifically, as shown in FIG. 2, in a case wherein the pin 14 is pressed into the grommet 12 for a predetermined volume or mount as shown by solid lines from a position shown by two-dot chain lines, an opening volume or amount (a deflection volume or amount) of the leg piece 34 of the grommet 12 at the contact point P1 with the guided portion 42 of the guide portion 56 is V. Also, as shown in FIG. 1, the tangent angle relative to the shaft line 14B at the contact point P1 is θ. Then, when the Young's modulus of the leg piece 34 of the leg portion 28 of the grommet 12 is presumed to be constant, and the frictional force between the grommet 12 and the pin 14 at the contact point P1 is presumed to be 0, a relationship of V sin θ=constant (H) is established at the arbitrary point P1 on a curved surface 56B of the guide portion 56.

Incidentally, if a value of H is reduced, a length Y (see FIG. 1) of the guide portion 56 of the pin 14 increases, so that the value of H is determined in view of the length Y of the guide portion 56 of the pin 14.

More specifically, as shown in FIG. 1, if E is the Young's modulus of the grommet 12, I is a second moment of area for the grommet 12, and L is a deflection length (see FIG. 2), a reaction force F from the guided portion 42 of the leg piece 34 of the grommet 12 vertically acted on the curved surface of the guide portion 56 is:

$$F=(3 \cdot E \cdot I/L^3)V$$

Incidentally, the reference symbol "m" in FIG. 2 represents a moving distance of the pin 14.

Here, although the Young's modulus E is a variable due to a distortion, if the Young's modulus E is presumed to be constant, $3 \cdot E \cdot I/L^3$ becomes a constant K (F=K·V), and as for the reaction force F, the opening volume of the leg piece 34 of the grommet 12 is proportional to V.

Also, as shown in FIG. 1, if μ is a friction coefficient, a component Fy in a Y direction of the reaction force F, and a component My in the Y direction of a frictional force M along the curved surface acted between the guide portion 56 and the guided portion 42 are:

$$Fy=F \cdot \sin θ; \text{ and}$$

$$My=M \cdot \cos θ=μF \cdot \cos θ.$$

As a result, the insertion force S of the pin is S=Fy+My=F·sin θ+μF·cos θ.

Here, if the component My in the Y direction of the frictional force M is disregarded, the insertion force S of the pin 14 is S=K·V·sin θ, and the insertion force S is proportional to V·sin θ. Consequently, the curved surface of the guide portion 56 can be the curved surface having the tangent angle θ such that the insertion force S becomes constant relative to a change of the opening volume (the deflection volume) V of the leg piece 34 at each contact point P1 from an end side toward a base portion side.

Figure 8:
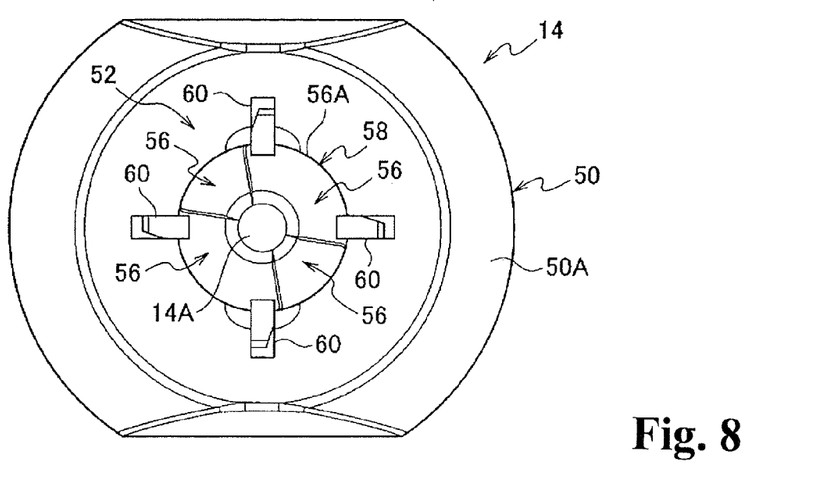
FIG. 8 is a front view showing the pin of the fastener viewed from an end side in a shaft direction according to one embodiment of the present invention.

As shown in FIG. 7 and FIG. 8, in the pin 14, there are formed four pieces of ribs 60 at equal intervals provided on a shaft flat surface around a shaft line of the base portion 58. Then, in the fastener 10, each rib 60 of the pin 14 is inserted into each slit 40 formed between the leg pieces 34 next to each other in the grommet 12, so that the grommet 12 is rotated to be locked relative to the pin 14. Incidentally, as shown in FIG. 3, the fastener 10 is shipped from a factory in a state wherein the grommet 12 and the pin 14 are assembled, and is mounted into the attachment hole 20 of the fastening member 16 and the attachment hole 22 of the fastened member 18.

Operation and Effect

Next, an operation and an effect of the present embodiment will be explained.

As shown in FIG. 3, the fastener 10 of the present embodiment is inserted into the attachment hole 20 and the attachment hole 22 in a state wherein the fastened member 18 is overlapped with the fastening member 16, and the attachment hole 22 is matched to the attachment hole 20. After that, as shown in FIG. 4, the pin 14 is pressed into the grommet 12, so that the guide portion 56 formed on the end side of the pin 14 contacts with the guided portion 42 of the grommet 12, and each leg piece 34 of the leg portion 28 of the grommet 12 bends and is expanded. Then, when the guided portion 42 of each leg piece 34 is engaged with the upper end edge 56A of the guide portion 56 of the pin 14, the pull-in force (an axial force) is generated in the fastener 10 by the reaction force of a deflection of the grommet 12, so that the fastening member 16 and the fastened member 18 are fastened.

At that time, as shown in FIG. 1 and FIG. 2, in the fastener 10 of the present embodiment, the guide portion 56 of the pin 14 has the curved surface having the tangent angle θ changing relative to the shaft line 14B at each contact point P1 with the guided portion 42 from an outer circumferential portion of the end 14A of the pin 14 toward the upper end edge 56A. Also, the insertion force S into the grommet 12 of the pin 14 is held approximately constant.

Namely, the Young's modulus of each leg piece 34 of the leg portion 28 is constant, and due to a reduction of the Young's modulus, an increase of the frictional force is negated in some measure, so that if the frictional force at the contact point P1 is presumed to be 0, and the opening volume of the leg piece 34 of the grommet 12 at the contact point P1 with the guided portion 42 of the guide portion 56 is V, and the tangent angle relative to the shaft line 14B of the pin 14 at the contact point P1 is θ, the relationship of V sin θ=constant is established at the arbitrary point P1 on the curved surface 56B of the guide portion 56.

Figure 9:
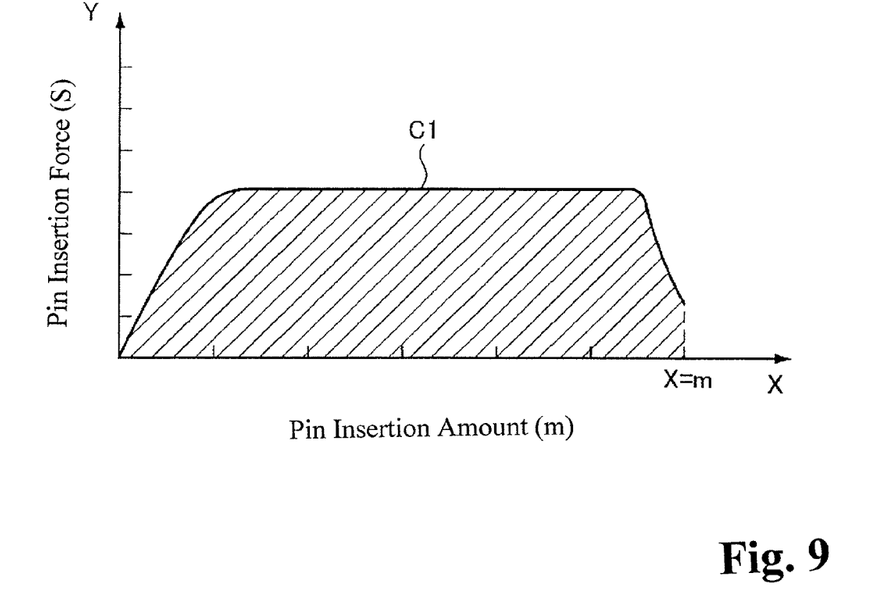
FIG. 9 is a graph showing a relationship between a moving distance of the pin and an insertion force of the pin in the fastener according to one embodiment of the present invention.

Therefore, as shown in FIG. 9, when the pin 14 is pressed into the grommet 12, and an insertion volume m is increased, an increase of the insertion force S into the grommet 12 of the pin 14 is controlled so as to become approximately constant. Consequently, in a second half of an insertion into the grommet 12 of the pin 14, the increase of the insertion force can be controlled so as to improve operability.

As a result, in the fastener 10 of the present embodiment, the pin 14 is smoothly inserted into the grommet 12 without rapidly changing the insertion force S into the grommet 12 of the pin 14, and the insertion force in the second half of the insertion of the pin 14 into the grommet 12 does not increase, so that an operator does not have to feel long until the insertion is completed.

Incidentally, as shown by diagonal lines in FIG. 9, the pull-in force of the fastener 10 of the present embodiment is shown by an area of a portion surrounded by a curved line C1, an X-axis, and X=m showing a relationship between the insertion volume m of the pin 14 and the insertion force S of the pin 14. As a result, by increasing the insertion volume m of the pin 14, after ensuring a sufficient pull-in force, the increase of the insertion force in the second half of the insertion of the pin 14 is controlled.

Also, in the fastener 10 of the present embodiment, the length Y (see FIG. 1) of the guide portion 56 of the pin 14 is determined by the value of V sin θ=constant (H). Also, V sin can approximate the insertion force S. Consequently, a comparison of a value of each V sin θ=constant (H) in a plurality of fasteners 10 can provide an indication of the insertion force S of the pin 14 in each fastener 10. As a result, the fastener 10, in which the insertion force S of the pin 14 and the length Y of the guide portion 56 of the pin 14 are predicted, can be designed.

Other Embodiments

In the above, specific embodiments of the present invention have been explained in detail. However, the present invention is not limited to the embodiments described hereinabove, and it is obvious for a person skilled in the art that other various embodiments can be carried out within a range of the present invention. For example, in the embodiments described hereinabove, the fastener 10 comprising the grommet 12 as the first member and the pin 14 as the second member has been explained. However, the fastener of the present invention can be applied to other fasteners in which the guide portion of the second member contacts with the guided portion of the first member by pressing the second member into the first member so that the leg portion of the first member bends and is expanded.

Also, in the embodiments, the Young's modulus of the leg piece 34 of the leg portion 28 of the grommet 12 is presumed to be constant, and the frictional force at the contact point P1 is presumed to be 0. In place of that, the increase of the frictional force and the reduction of the Young's modulus associated with the increase of the insertion volume of the pin may be considered. Incidentally, the increase of the frictional force and the reduction of the Young's modulus negate each other in some measure, and change by a material of the fastener 10 or a thickness of the fastening member 16, so that a change of the Young's modulus of the leg piece 34 and weighting of the frictional force may be added.

What is claimed is:

1. A fastener, comprising:
a first member including a flange portion, and a leg portion extending from the flange portion, forming an insertion hole opening at the flange portion, divided around a shaft line to form a plurality of leg pieces, and formed with a guided portion in an inner circumferential portion of the insertion hole opening; and
a second member having a base portion on one end thereof and a guide portion formed from a vicinity of another end of the second member toward the base portion, and pressed into the insertion hole opening of the first member so as to contact the guide portion with the guided portion and to expand the plurality of leg pieces,
wherein the guide portion has a curved surface curved outwardly and having a tangent angle changing relative to the shaft line at a contact point with the guided portion from another end side toward a base portion side, and an insertion force into the first member at the contact point is held approximately constant, and
the guide portion of the second member is arranged so that when Young's modulus of the leg portion is presumed to be constant, and a frictional force at the contact point is presumed to be 0, and an opening amount of each of the plurality of leg pieces at an arbitrary point on the curved surface is V and the tangent angle is $\theta$, a relationship of $V \sin \theta$=constant is established at the arbitrary point on the curved surface.

2. A fastener according to claim 1, wherein the guide portion of the second member is arranged so that the tangent angle $\theta$ decreases relative to an increase of the opening amount V from the vicinity of said another end toward the base portion whereby the insertion force into the first member is constant.

3. A fastener according to claim 2, wherein the guided portion protrudes inwardly and downward from the inner circumferential portion of the insertion hole opening toward the shaft line and receding to point contact the guide portion of the first member.

* * * * *